UNITED STATES PATENT OFFICE.

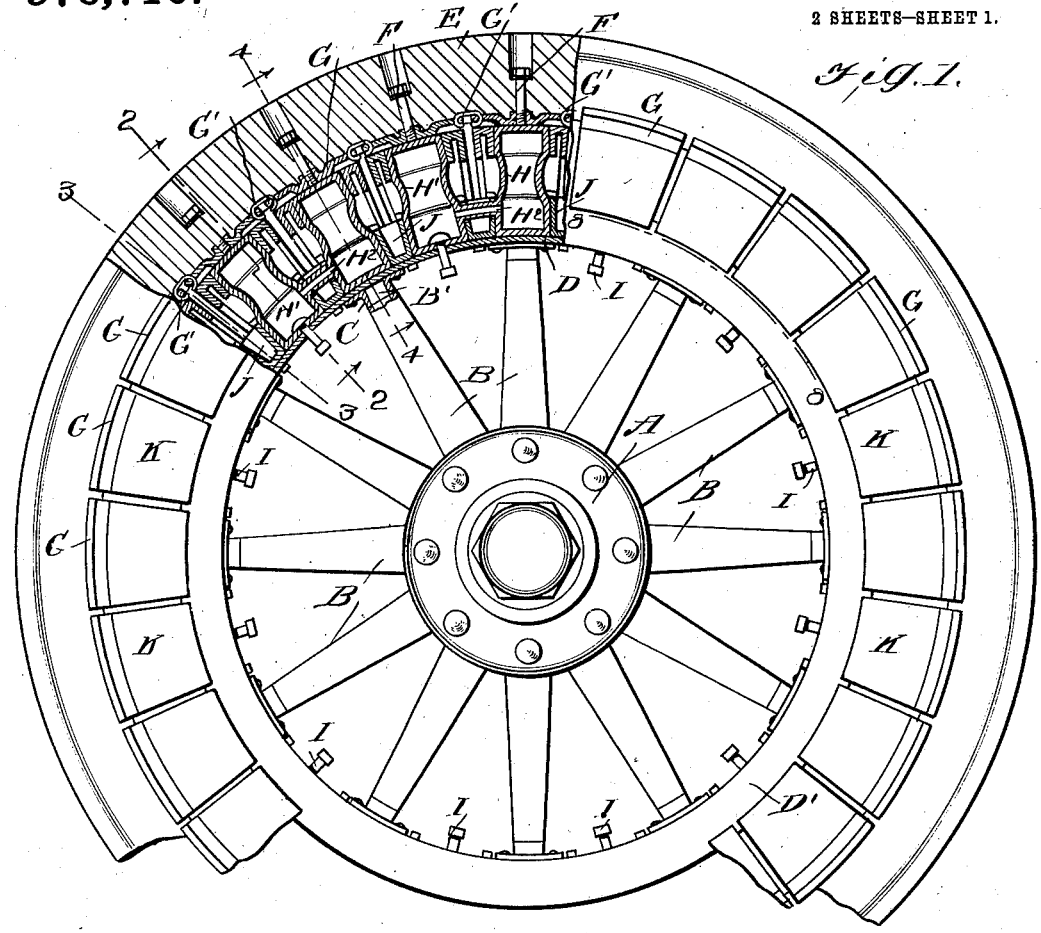
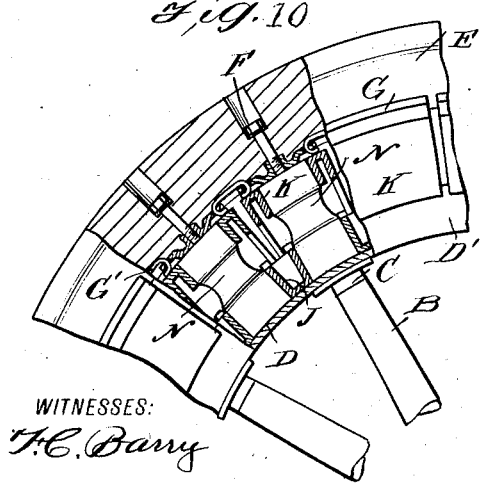
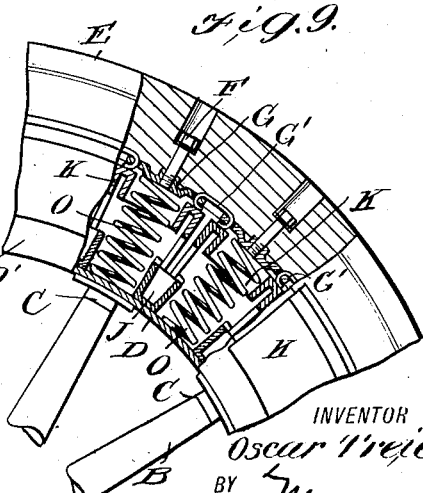

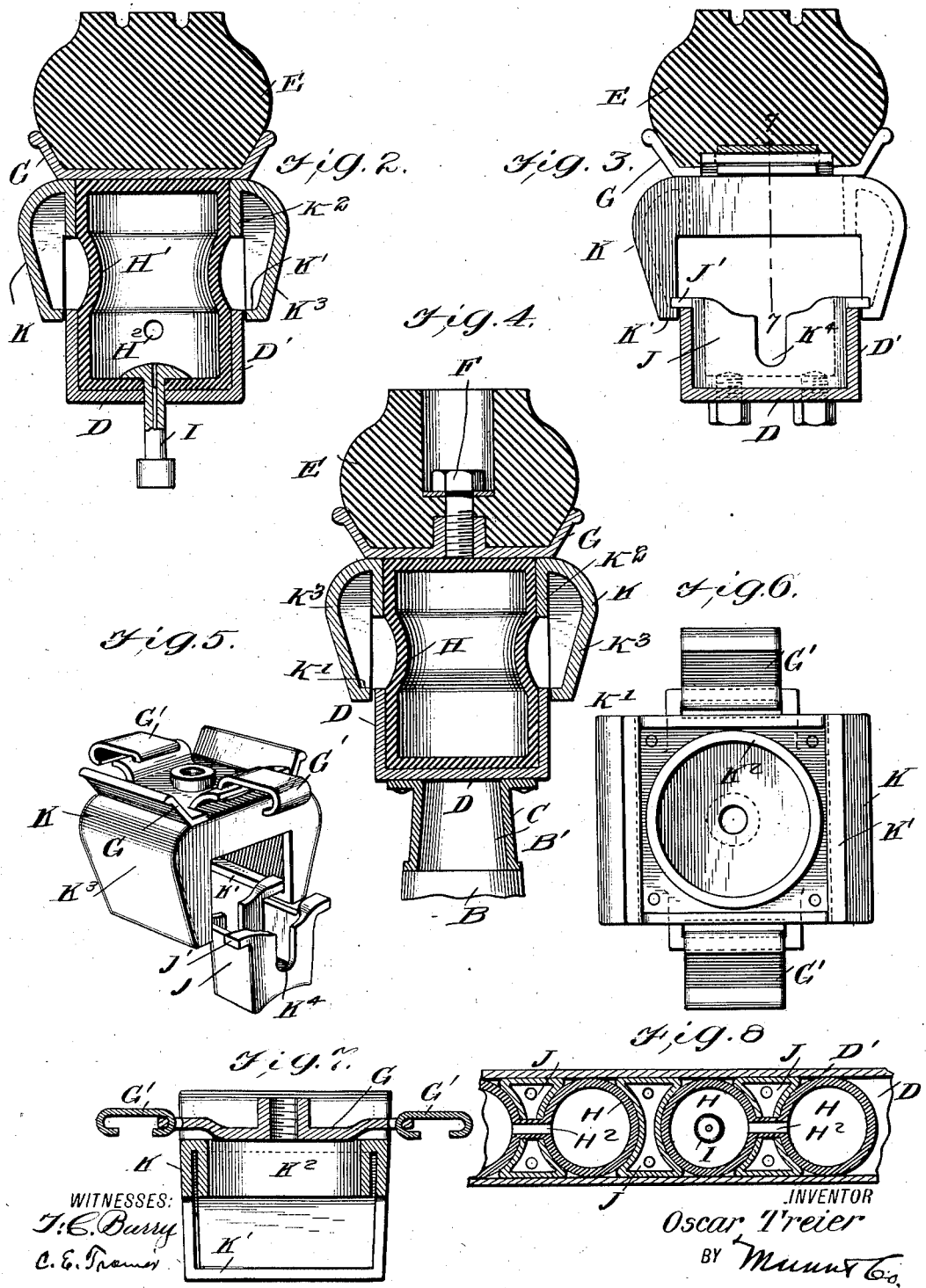

OSCAR TREIER, OF NEW YORK, N. Y.

VEHICLE-WHEEL.

976,710.

Specification of Letters Patent. Patented Nov. 22, 1910.

Application filed January 31, 1908. Serial No. 413,503.

*To all whom it may concern:*

Be it known that I, OSCAR TREIER, a citizen of Switzerland, and a resident of the city of New York, borough of Manhattan, in the county and State of New York, have invented a new and Improved Vehicle-Wheel, of which the following is a full, clear, and exact description.

The object of the invention is to provide a new and improved vehicle wheel, more especially designed for use on automobiles, bicycles and other vehicles, and arranged to readily yield and cushion the vehicle.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement, parts being in section; Fig. 2 is an enlarged transverse section of the same, on the line 2—2 of Fig. 1; Fig. 3 is a similar view of the same, on the line 3—3 of Fig. 1; Fig. 4 is a like view of the same, on the line 4—4 of Fig. 1; Fig. 5 is a perspective view of a pair of stop sections. Fig. 6 is a bottom plan view of the upper stop section. Fig. 7 is a transverse vertical section of the upper stop section and the tread plate, the section being on the line 7—7 of Fig. 3. Fig. 8 is a section on the line 8—8, of Fig. 1. Fig. 9 is a side elevation partly in section of a modified form of the improvement, and, Fig. 10 is a similar view of another modified form of the improvement.

From the hub A of the vehicle wheel radiate the spokes B having their reduced ends B' fitting into sockets C, riveted, bolted or otherwise fastened to the annular rim D, preferably made of metal or other suitable material. The tire for the rim D is formed of an annular tread E of rubber or a like material, and secured to flanged tread plates G by the use of bolts F countersunk below the peripheral surface of the tread E, as plainly illustrated in the drawings. The tread plates G are connected with each other by links G' and between the said tread plates G and the rim D are interposed cushioning devices, such as inflatable chambers H, H', connected with each other by a pipe H², one of the chambers (as shown the chamber H') being provided with a suitable valve I, for connection with an air pump, to inflate the connected chambers H and H'. As shown in the drawings, the chambers H and H' engage adjacent tread plates G, the chamber H being in radial alinement with a spoke B while its mate H' extends between adjacent spokes, as will be readily understood by reference to Fig. 1.

In order to protect the inflatable chambers H and H' and to limit the outward expansion thereof, the following arrangement is made: A stop J, shown more particularly in Fig. 5, is arranged between each pair of chambers H, H', each of the said stops being in the form of a cup arranged transversely of the rim and provided at each end with a pair of lugs J'. The stops J are bolted or otherwise secured to the rim D, the lugs J' extending outwardly above the side flanges D' of the said rim. A stop K is arranged between each pair of stops J, each of the stops K inclosing the upper end of one of the chambers H, H'. The said stops K are bolted or otherwise secured to tread plates G, and each stop is provided with a circular opening in its upper face, and with a depending flange K² encircling the opening. The chamber H or H' extends through the circular opening and engages the inner face of the tread plate G.

Each of the stop sections K is provided at its ends with depending flanges K³, and each of the flanges is provided at its lower end with an inwardly extending lug or flange K' for engagement by the lugs of a pair of stops J.

The pipe H² connecting the adjacent chambers, passes through notches or recesses K⁴ in the side walls of the stop sections J, and the side walls of the said stop sections J are curved inwardly as shown in Fig. 8, to fit the walls of the chambers H, H'.

The stop sections prevent injury to the inflatable chambers, and at the same time they limit the outward or expanding movement of the chambers by engagement of the flanges K' with the lugs J' on the stop sections J as shown more particularly in Figs. 3 and 5.

The flanges K' ride on the outer faces of the side flanges D' of the rim D, to guide the said sections K in their movement.

It will be observed that the stop sections consist each of cups, one of which incloses the other, so that the two sections comprise practically a chamber consisting of telescopic sections. Sundry of the sections have their edges provided with stops.

Instead of using cushioning devices in the form of inflatable chambers H and H', as described, use may be made of solid rubber blocks N, as shown in Fig. 8, or coiled springs O, as illustrated in Fig. 9, it being understood that the said cushioning blocks N or the said cushioning springs O are interposed between the tread plates G and the rim D, and are protected by the stop sections J and K.

A wheel constructed in the manner described is comparatively simple and durable in construction, and can be readily and conveniently repaired whenever necessary.

Having thus described by invention, I claim as new and desire to secure by Letters Patent:

1. A vehicle wheel comprising a flanged rim, an annular series of connected tread plates arranged concentric with the rim, a cushioning device consisting of an inflatable chamber arranged between each tread plate and the rim, said chambers being connected, and sundry of the chambers being provided with valves, a cup-shaped stop section encircling the outer end of each of the inflatable chambers and abutting against the tread plate, a stop section arranged between each pair of adjacent chambers, said first named stop section having flanges, and the last named stop section having lugs for engaging the flanges of a pair of adjacent first-named stop sections, and a tire encircling the wheel resting on the tread plates.

2. A vehicle wheel comprising a flanged rim, an annular series of connected tread plates arranged concentric with the rim, a cushioning device arranged between each tread plate and the rim, a cup-shaped stop section inclosing the outer end of each of the cushioning devices, a stop section arranged between each pair of adjacent cushioning devices, said last named stop section having lugs for engaging a pair of the adjacent first named stop sections, and a tire seated on the tread plates.

3. A vehicle wheel comprising a flanged rim, an annular series of connected tread plates concentric with the rim, a tire seated on the tread plates, a bolt securing each tread plate to the tire, said tire being countersunk to receive the head of the bolt and the tread plate having an internally threaded boss for engagement by the bolt, a cushioning device between each tread plate, and the rim, a stop section inclosing the outer end of each of said cushioning devices and a stop section arranged between the inner ends of the adjacent cushioning devices, said stop sections having interengaging stops for limiting the movement of the sections away from each other.

In testimony whereof I have signed my name to this specification in the presence of two subscribing witnesses.

OSCAR TREIER.

Witnesses:
WM. J. LOHRMAN,
FRED. W. L. HOMAN.